United States Patent
Ishibashi

(10) Patent No.: US 8,018,618 B2
(45) Date of Patent: Sep. 13, 2011

(54) INFORMATION PROCESSING APPARATUS THAT OUTPUTS IMAGES HAVING SAME SIZE TO SINGLE PAGE OF RECORDING SHEET AND COMPUTER READABLE MEDIUM

(75) Inventor: Masayuki Ishibashi, Hekinan (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1366 days.

(21) Appl. No.: 11/550,308

(22) Filed: Oct. 17, 2006

(65) Prior Publication Data

US 2007/0086055 A1    Apr. 19, 2007

(30) Foreign Application Priority Data

Oct. 18, 2005 (JP) ................. 2005-302762

(51) Int. Cl.
*G06K 15/00* (2006.01)
(52) U.S. Cl. ........ 358/1.18; 358/1.2; 358/1.1; 358/1.13; 358/450; 382/112; 382/284
(58) Field of Classification Search ............... 358/1.18, 358/1.1, 1.13, 1.15, 450; 382/112, 284
See application file for complete search history.

(56) References Cited

U.S. PATENT DOCUMENTS

| | | | |
|---|---|---|---|
| 7,095,526 B1* | 8/2006 | Housel | 358/1.18 |
| 2002/0040375 A1* | 4/2002 | Simon et al. | 707/517 |
| 2004/0012814 A1* | 1/2004 | Tanaka et al. | 358/1.18 |
| 2004/0109201 A1 | 6/2004 | Teraue | |
| 2004/0174544 A1* | 9/2004 | Cassidy et al. | 358/1.8 |
| 2005/0099660 A1* | 5/2005 | Yada et al. | 358/498 |

FOREIGN PATENT DOCUMENTS

| | | |
|---|---|---|
| JP | H10-181119 A | 7/1998 |
| JP | 168617 | 6/1999 |
| JP | H11-212755 A | 8/1999 |
| JP | 2000-127547 A | 5/2000 |
| JP | 2002-094909 A | 3/2002 |
| JP | 2004-187266 A | 7/2004 |

OTHER PUBLICATIONS

Japan Patent Office; Notification of Reason for Refusal for Patent Application No. JP2005-302762, dated Aug. 6, 2010. (counterpart to above-captioned U.S. patent application).

* cited by examiner

*Primary Examiner* — Benny Tieu
*Assistant Examiner* — Martin Mushambo
(74) *Attorney, Agent, or Firm* — Baker Botts L.L.P.

(57) ABSTRACT

An information processing apparatus that includes: a layout area acquisition unit which obtains in order to output a plurality of images of a same size for a single page of a recording sheet, a size of a layout area on the recording sheet on which the images are to be arranged; an image size acquisition unit which obtains the size of the images; an image arranging unit which creates data for arranging the images so that margins are not generated between the images in the layout area; and a data output unit which outputs an instruction to a printing unit to print layout data for the images.

7 Claims, 13 Drawing Sheets

INFORMATION PROCESSING APPARATUS THAT OUTPUTS IMAGES HAVING SAME SIZE TO SINGLE PAGE OF RECORDING SHEET AND COMPUTER READABLE MEDIUM

CROSS-REFERENCE TO RELATED APPLICATION

This application claims priority from Japanese Patent Application No. 2005-302762, filed Oct. 18, 2005, the entire contents of which are hereby incorporated by reference into the present application.

TECHNICAL FIELD

Aspects of the present invention relate to an information processing apparatus that outputs a plurality of images having the same size to a single page of a recording sheet, without any space being wasted, and an information processing program therefor.

BACKGROUND

Conventionally, a computer is employed to create and process an image, and to print a plurality of the same images in a row on a single page of a recording sheet. That is, there is a computer system that has a layout function for arranging and printing a plurality of images on a single page of a sheet. This layout function for arranging N images on a single page is called an "N in 1" function. According to this function, for example, a computer is employed to create an original document for a business card, and to print a plurality of such documents on a single page of a recording sheet.

A conventional printed example is shown in FIG. 13. The example in FIG. 13 is an "8 in 1" function that arranges eight images (documents 31) on a single page of a recording sheet 32. For such a printing system, an image printing layout is predesignated, and when eight images (documents 31) are to be printed on a single page of the recording sheet 32, as shown in FIG. 13, the positions of the individual images are determined in accordance with the predesignated layout. Thus, extra margins occur that cannot be effectively utilized.

SUMMARY

In this case, it is preferable that as many images as possible be printed on a single page of a recording sheet in order to reduce sheet wastage. However, as described above, the layout is predesignated and the margins between images cannot be effectively employed.

Aspects of the present invention provide an information processing apparatus that outputs a plurality of images having the same size on a single page of a recording sheet, with wasted space being minimized, and an information processing program therefor.

DETAILED DESCRIPTION

General Overview

Figure 1:
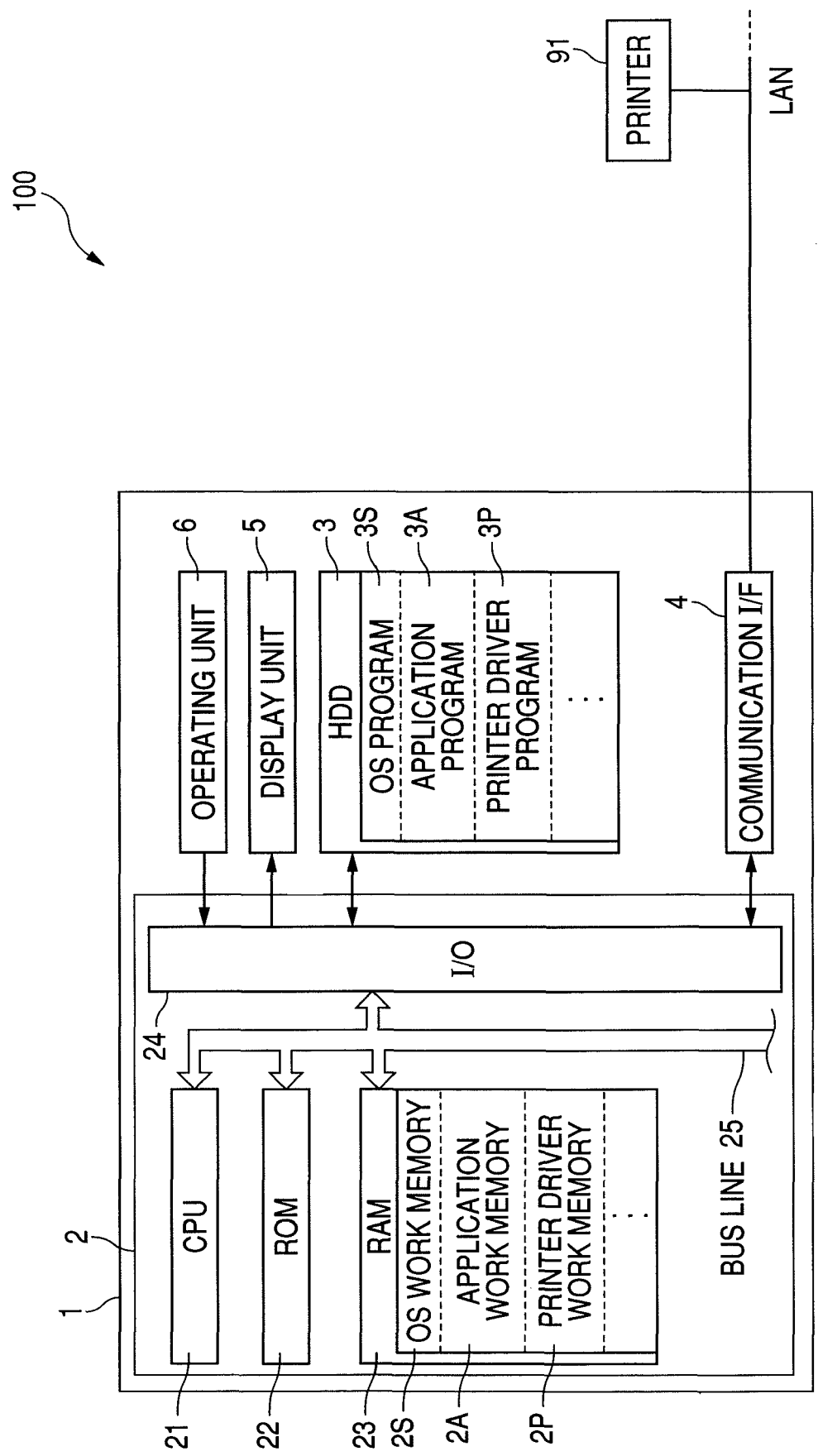
FIG. 1 is an electronic block diagram showing an information processing apparatus according to an aspect of the present invention.

According to an aspect of the invention, there is provided an information processing apparatus comprising: a layout area acquisition unit which obtains in order to output a plurality of images of a same size for a single page of a recording sheet, a size of a layout area on the recording sheet on which the images are to be arranged; an image size acquisition unit which obtains the size of the images; an image arranging unit which creates data for arranging the images so that margins are not generated between the images in the layout area; and a data output unit which outputs an instruction to a printing unit to print layout data for the images.

According to the configuration of the information processing apparatus, the layout area acquisition unit obtains the size of the layout area on a recording sheet. Then, based on the size of the layout area and the size of image data obtained by the image size acquisition unit, the image arranging unit arranges the images so that no margins are generated between the images in the layout area. Thereafter, the data output unit permits the printing unit to print the layout data. As a result, a plurality of images can be output on a single page of a recording sheet, without any space being wasted. The image data can be used for the representation of, for example, photographs, graphics or characters.

Further, the image arranging unit may arrange images so that the sides of the individual images printed in the layout area on the recording sheet are aligned with each other. Conventionally, since the layout is predesignated, margins are generated between images, and many images cannot be printed on a single page of a recording sheet. However, with the configuration according to an aspect of the present invention, images are arranged with their sides aligned, and thus many images can be printed on a single page of a recording sheet.

More specifically, to arrange a first image, the image arranging unit aligns a short side of the image, which is quadrilateral in shape, with either a long or short side of a layout area, which is also quadrilateral in shape, and aligns a long side of the image with the other of the long or short side of the layout area. Sequentially, thereafter, the image arranging unit arranges images by aligning long sides of the images in the direction of their short sides, and as a result, an arrangement of images at a first level is completed.

As described above, to arrange the first image, the short side of an image having a quadrilateral shape is aligned with the long side or the short side of a layout area that also has a quadrilateral shape, and the long side of the image is aligned with the other side of the long or short side of the layout area. By employing this process, the layout area can be effectively used.

Further, for the arrangement of images at multiple levels, the image arranging unit arranges an image at a succeeding level in the same direction as the image at the current level so as to align the image with the short side of the image at the current level. When the long side of an image will not fit in a remaining portion of the layout area, the image is arranged at a new level so that a short side is aligned with the other of the long or short side of the layout area.

Since the image arranging unit arranges an image at a succeeding level in the same direction as an image at the current level, so that the image at the succeeding level is aligned with the short side of the image at the current level, images can be arranged at multiple levels, without gaps. Furthermore, if the long side of an image does not fit in the remaining portion of the layout area, the image can be arranged by changing the image arrangement direction. Thus, more images can be printed in the layout area on a recording sheet.

The information processing apparatus may further comprise: an arranged image count setting unit which sets an arbitrary number of images to be arranged on a single page of a recording sheet, wherein, when a number of arranged images that is set for the arranged image count setting unit is smaller than an available number of images to be arranged, the available number of images having been calculated by the image arranging unit, the image arranging unit reduces the number of images for the layout area so as to decrease a length of a printed area in a direction in which the recording sheet is to be printed.

According to this arrangement, a user can employ the arranged image count setting unit to designate an arbitrary number of images to be arranged. Further, since a reduced number of images for the layout area can be output, so as to decrease the size of the printed area in the direction in which the recording sheet is printed, a substantially large margin portion can be obtained, and this margin may effectively be employed for another purpose.

The information processing apparatus may further comprise: an arranged image count setting unit which sets an arbitrary number of images to be arranged on a single page of a recording sheet; and an image size reduction unit, which, when a number of arranged images set for the arranged image count setting unit is greater than an available number of images to be arranged, the available number of images having been calculated by the image arranging unit, reduces the sizes of the images. According to this arrangement, since the image size reduction unit reduces the sizes of images, more images can be printed on a recording sheet.

The information processing apparatus may further comprise: an image moving unit which moves arranged images to desired positions within the layout area. According to this arrangement, once images have been arranged for the layout area, a user can move a plurality of the images to desired positions within the layout area.

Furthermore, a program product according to another aspect of the present invention comprises software instructions for enabling a computer to perform predetermined operations, and a computer readable medium bearing the software instructions. The predetermined operations includes the steps of: obtaining, so as to output a plurality of images of a same size for a single page of a recording sheet, a size of a layout area on the recording sheet on which images are to be arranged; obtaining the size of the images; creating data to arrange the images so that margins are not generated between the images in the layout area; and outputting an instruction to a printing unit to print layout data for the images.

The program product enables a computer to create data for the arrangement of images, so as to avoid the generation of margins between images in a layout area, and permits a printing unit to output this data.

Figure 2:
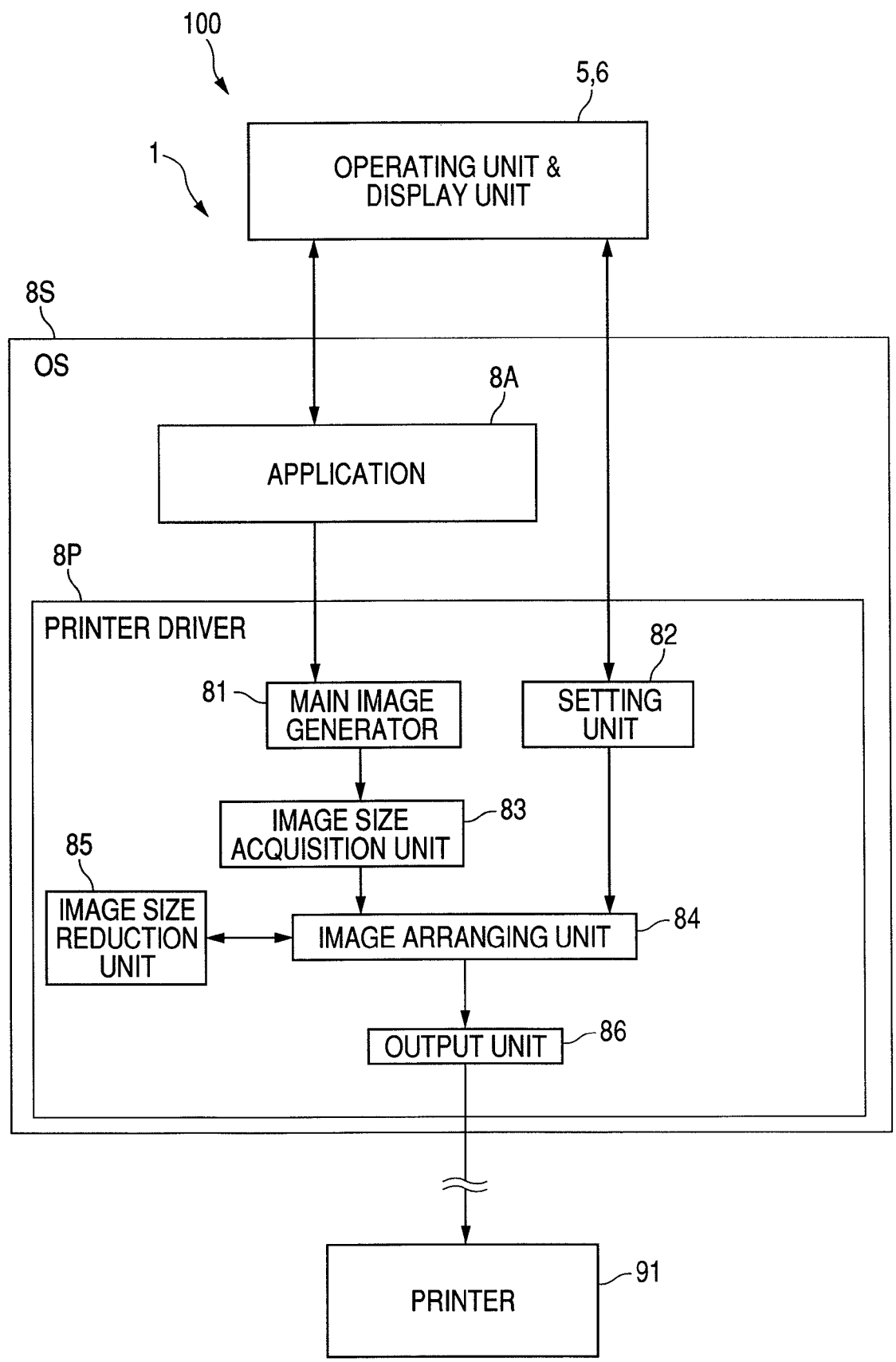
FIG. 2 is a functional block diagram showing the information processing apparatus.

Aspects of the present invention will now be described with reference to the drawings. FIG. 1 is an electronic block diagram showing a personal computer (PC) 1 that serves as an information processing apparatus. FIG. 2 is a functional block diagram showing the PC 1. The PC 1 and a printer 91 (a printing unit) connected thereto constitute a printing system 100, and when the PC 1 transmits a printing instruction to the printer 91, the printer 91 performs the processing for the printing operation. The PC 1 includes a printer driver program 3P (see FIG. 1), and serves as a printer driver 8P (see FIG. 2). The printer driver 8P has an image data arrangement function that, as shown in FIG. 7, arranges a plurality of document images 31 (image data) so that there are no gaps between them, and permits the printer 91 to print the document images 31. The individual components will now be explained in detail.

The configuration of the PC 1 will now be described. As shown in FIG. 1, the PC 1 is a personal computer, and includes an HDD (Hard Disk Drive) 3, a communication I/F (Interface) 4, a display unit 5 and an operating unit 6, and a control circuit 2 to which all these components are connected.

An OS program 3S, which serves as an operating system (OS) 8S that operates the PC 1, an application program 3A, which serves as an application 8A that runs on the OS 8S, and the printer driver 3P, which serves as the printer driver 8P that runs on the OS 8S, are stored on the HDD 3.

The communication I/F 4 is a network adaptor having an interface function for a LAN (a Local Area Network), and enables communication with a device, such as the printer 91 that is connected to the LAN. In this aspect, a network printer connected to the LAN is employed as an example, however, a local printer connected directly to a PC may also be employed.

The display unit 5 is a device, such as a liquid crystal display device or a CRT display device. The operating unit (operation means) 6 is an input device, such as a pointing device, like a mouse or a keyboard.

The control circuit 2 is provided as a computer unit, and includes a CPU 21, a ROM 22, a RAM 23, an input/output interface (I/O) 24, and a bus line 25 to which all these components are connected. The CPU 21 controls the operations based on the OS program 3S stored on the HDD 3. The OS program 3S is operated by employing an OS work memory 2S in the RAM 23. The application program 3A and the printer driver program 3P are operated by respectively employing an application work memory 2A and a printer driver work memory 2P in the RAM 23. With this arrangement, the control circuit 2 serves as a layout area acquisition unit, an image size acquisition unit, an image arranging unit, a data output unit, an image size reduction unit and a moving unit.

The printer 91 is connected to the LAN to enable the exchange of data with the PC 1, and performs the processing for a printing operation upon receiving an instruction from the PC 1. For this printing operation, a corresponding printer driver should be installed in the PC 1. In this aspect, the printer 91 is indirectly connected to the PC 1 via the LAN.

However, the printer 91 may be directly connected to the PC 1 via a parallel port or a USB port (not shown).

The operation of the PC 1 will now be described. When the CPU 21 executes the printer driver program 3P stored on the HDD 3, the PC 1 serves as the printer driver 8P shown in FIG. 2.

The printer driver 8P is a module for generating print data in consonance with the printer 91, which is an output device, and transmitting the print data. The printer driver 8P includes: a main image generator 81, a setting unit (a layout area acquisition unit, an arranged image count setting unit and an image size reduction unit) 82, an image size acquisition unit 83, an image arranging unit 84, an image size reduction unit 85 and an output unit (a data output unit) 86.

Figure 3:
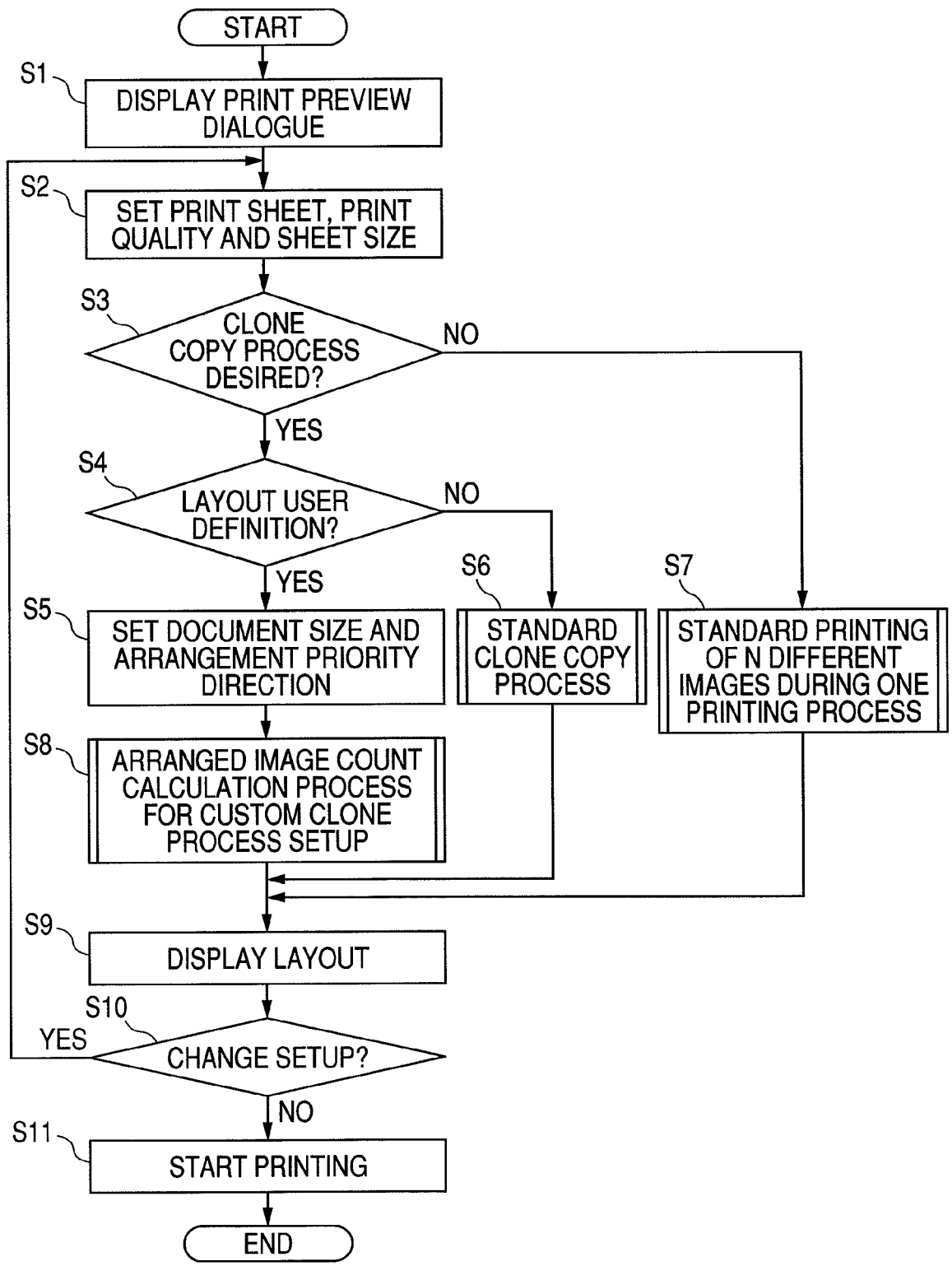
FIG. 3 is a flowchart showing the processing performed by the information processing apparatus.

First, a user employs the PC 1 to read, create and process document images (image data). The image data may be used to represent a photograph, a drawing or characters, and are, for example, data for a document, such as a business card. While referring to the flowchart in FIG. 3, an explanation will be given for the printing processing performed by the printer driver 8P when the user employs the PC 1 to print multiple images of this document on a single page of a recording sheet 32.

Figure 5:
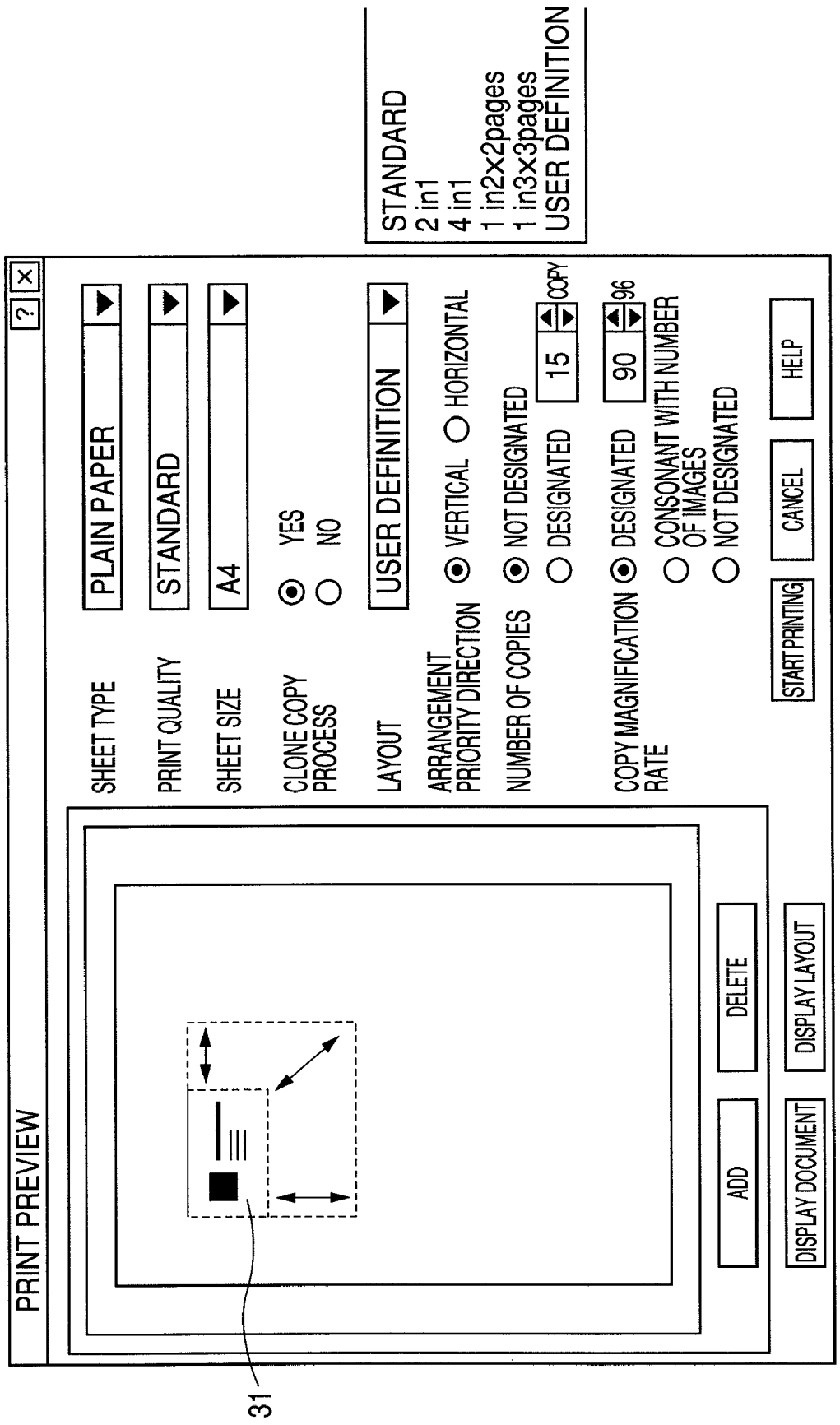
FIG. 5 is a diagram showing an example of a setup screen employed by a user.

When the user has prepared arbitrary document data, the application 8A, located higher in hierarchy chain than the printer driver 8P, transmits the document data to the printer driver 8P, for the printing of the document data by the printer 91. Upon receiving the document data, the main image generator 81 employs the data to generate, for example, bit map data, which are data for an image to be printed, and displays a print preview dialogue on the display unit (S1). An example of a print preview dialogue is shown in FIG. 5. On this screen, when, for example, the document 31 is selected using a mouse and is dragged, the size of the document 31 can be changed.

On the print preview dialogue, the user designates the type of printing sheet (a recording sheet 32), the printing quality (the image quality) and the sheet size (S2).

Sequentially, on the print preview dialogue, the user indicates whether a clone copy process (to copy one set of document data in order to output multiple sets of the same data, i.e., to obtain N of the same images using synthesization) is or is not desired (S3). When a clone copy process is not desired (NO at S3), the standard printing process, or the N in 1 printing process (N different images for one printing process), during which N different images are arranged, is performed (S7). In this case, the standard printing process is a process during which the printer driver 8P processes data and prepares layout data for the printing of only one image of a document.

When the user selects the clone copy process (YES at S3), then, the user must decide whether a user definition for a layout should be employed (S4). When the user decides that a user definition is not to be used for the clone copy process (NO at S4), the printer driver 8P processes and prepares layout data so as to perform a standard clone copy process, i.e., the N in 1 printing process (N of the same images printed during 1 printing process) in which the same N images are arranged. That is, when the user manipulates the operating unit 6 to select the clone copy process, this instruction is transmitted to the setting unit 82, and based on this instruction, the image arranging unit 84 prepares layout data.

When, at S4, the user indicates that a user definition for a layout is to be used (YES at S4), a document size and an arrangement priority direction are designated (S5). The arrangement priority direction is either "vertical" or "horizontal", and a case wherein the long side of the document 31 is parallel to the long side of the recording sheet 32 is defined as vertical, while a case wherein the long side of the document 31 is perpendicular to the long side of the recording sheet 32 is defined as horizontal. The document size can be changed by using the mouse to drag the document on the display screen in the print preview dialogue (see FIG. 5).

Figure 4:
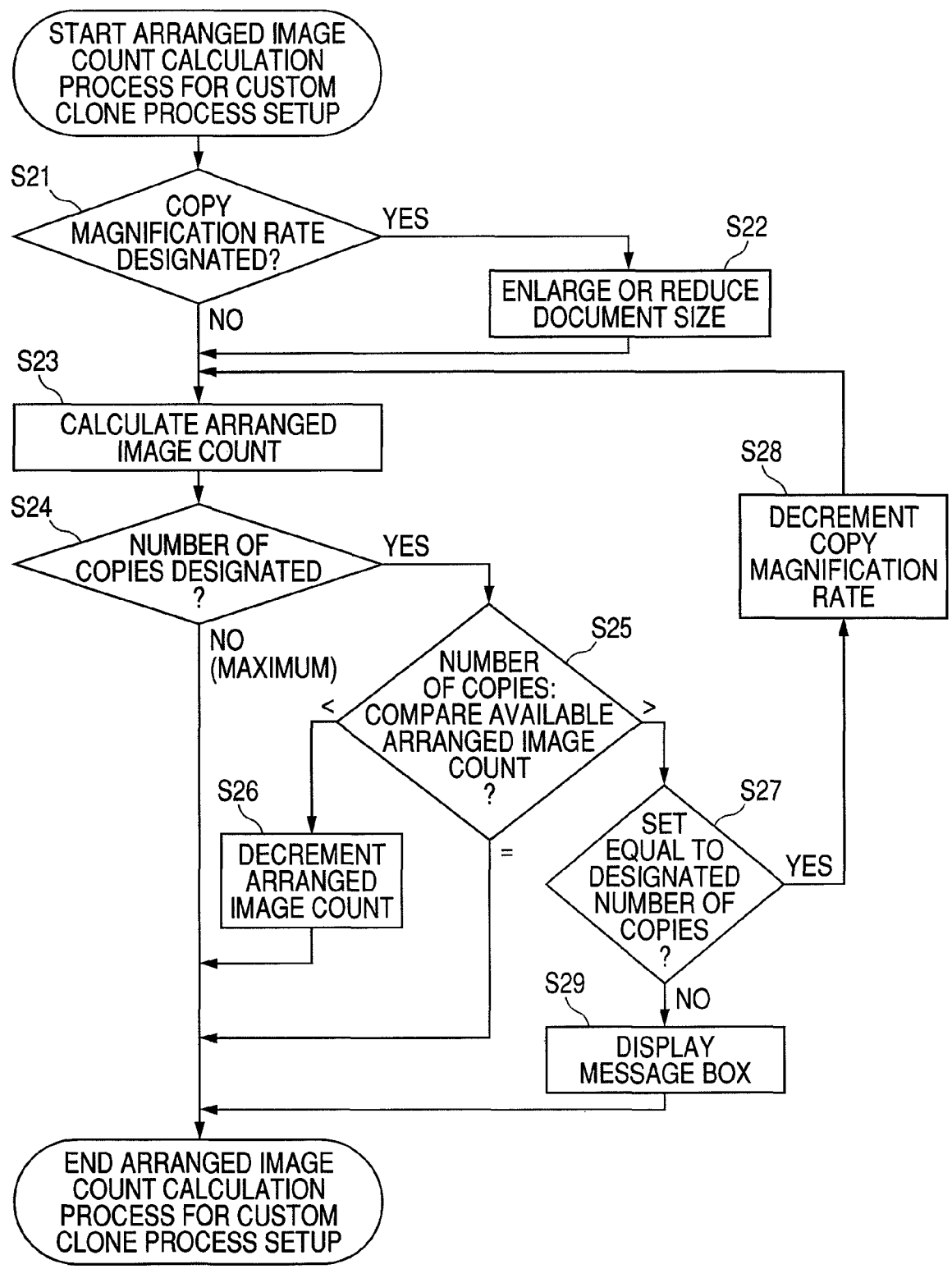
FIG. 4 is a flowchart showing the arranged image count calculation processing performed by the information processing apparatus.

When the user has designated the document size and the arrangement priority direction, and when the "layout display" is selected using a mouse, for example, to click on the print preview dialogue, the printer driver 8P performs the arranged image count calculation process for a custom clone copy process setup (S8). This arranged image count calculation process will be described while referring to FIG. 4. The printer driver 8P then determines whether the user has designated a copy magnification rate (S21). When a copy magnification rate has been designated, the document size is enlarged or reduced in accordance with the designated copy magnification rate (S22).

At S23, the image arranging unit 84 of the printer driver 8P calculates the layout for document images on the recording sheet 32. When a magnification rate for the document has been designated, the calculation is performed based on the enlarged or reduced document size at S22.

Figure 6A:
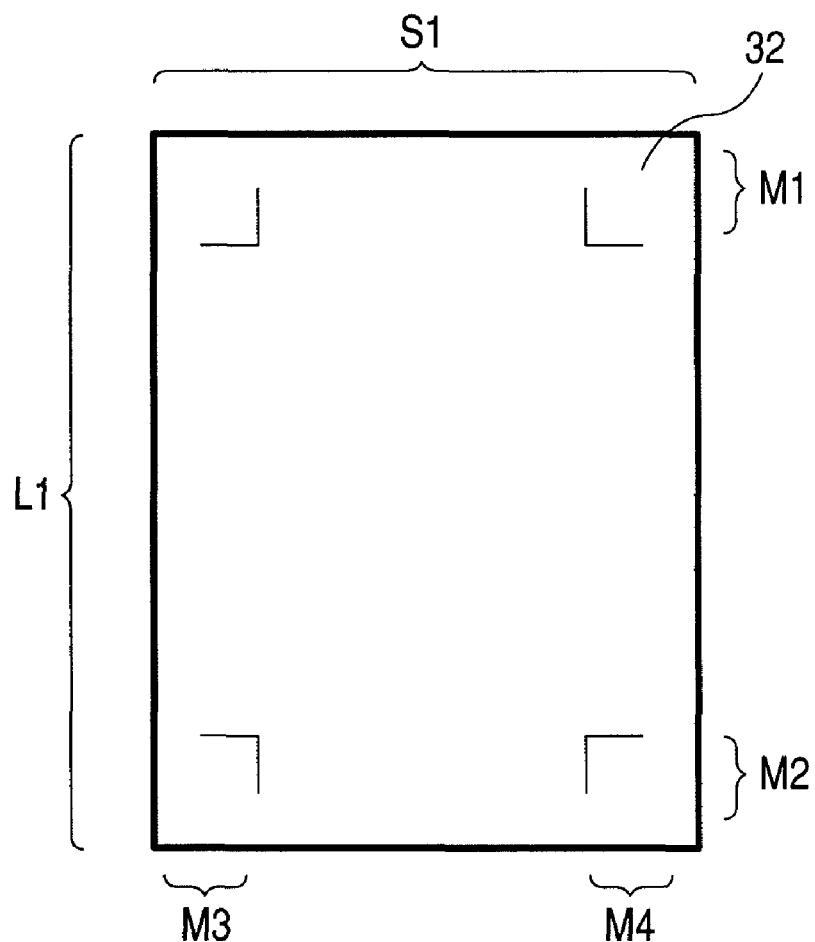
FIGS. 6A and 6B are diagrams showing the dimensions of a recording sheet and a document.
Figure 6B:
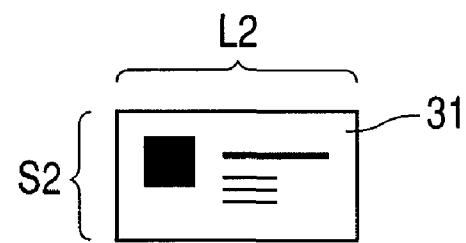

A case wherein the arrangement priority direction is vertical will now be explained while referring to FIGS. 6A to 7B. As shown in FIG. 6A, L1 and S1 respectively denote the long side and the short side of the recording sheet (the printing sheet), and M1 to M4 denote the lengths of top, bottom, left and right margins. In this case, the document 31 is arranged on the recording sheet 32 so that the long side of the document 31 is aligned with the long side of the recording sheet 32. First, the number of document images 31 arranged along the short side of the recording sheet 32 is calculated. Then, the lengths of margins M3 and M4 for the recording sheet 32 are subtracted from the length of the short side S1 of the recording sheet 32, and the obtained length is divided by the length of the short side S2 of the document 31. Here, the quotient is the number of the document images 31 that can be arranged along the short side of the recording sheet 32. It should be noted that when the enlargement or reduction of a document size is designated, S2 is the length of the enlarged or reduced size. That is, a number Q of the document images 31 that can be arranged along the short side of the recording sheet 32 can be obtained using (S1−M3−M4)/S2.

Figure 7A:
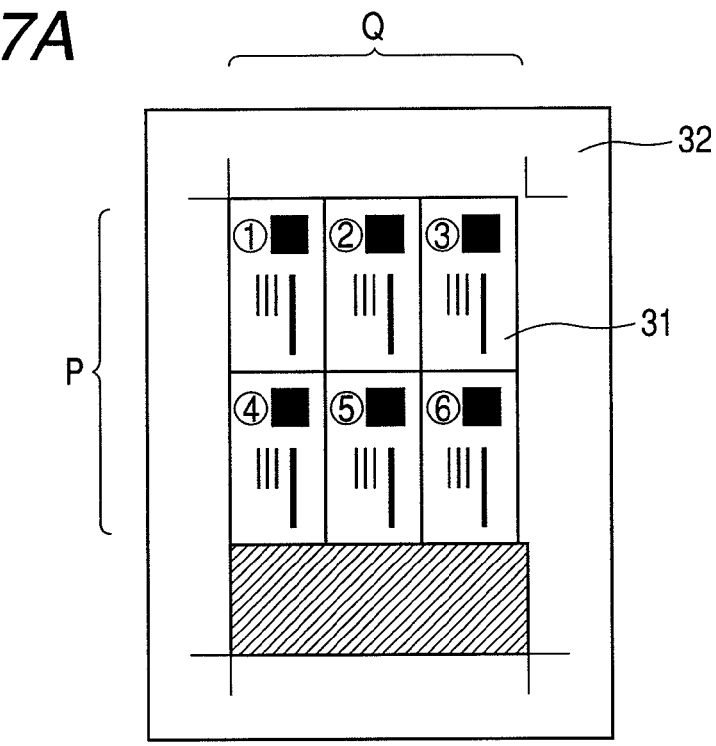
FIGS. 7A and 7B are diagrams showing the arrangement of images when the arrangement priority direction is vertical.

Similarly, the number of the document images 31 to be arranged along the long side is calculated. The lengths of margins M1 and M2 on the recording sheet 32 are subtracted from the length of the long side L1 of the recording sheet 32, and the obtained length is divided by the length of the long side L2 of the document 31. Here, the quotient is the number of the document images 31 that can be arranged along the long side of the recording sheet 32. It should be noted that when the enlargement or reduction of a document size is designated, L2 is the length of the enlarged or reduced size. That is, a number P of the document images 31 that can be arranged along the long side of the recording sheet 32 can be obtained using (L1−M1−M2)/L2. Through this calculation, the number of the document images 31 to be arranged is determined to be P×Q, and the document images 31 are arranged in the number order 1 to 6, as shown in FIG. 7A.

That is, a first document 31 is arranged so as to align its long side with the long side of the layout area and to align its short side with the short side of the layout. A second document 31 is arranged so as to align its long side with the long side of the first document 31. Documents 31 in the second line (second level) are arranged so as to align their short sides with the short sides of the documents 31 in the first line (first level)

Figure 7B:
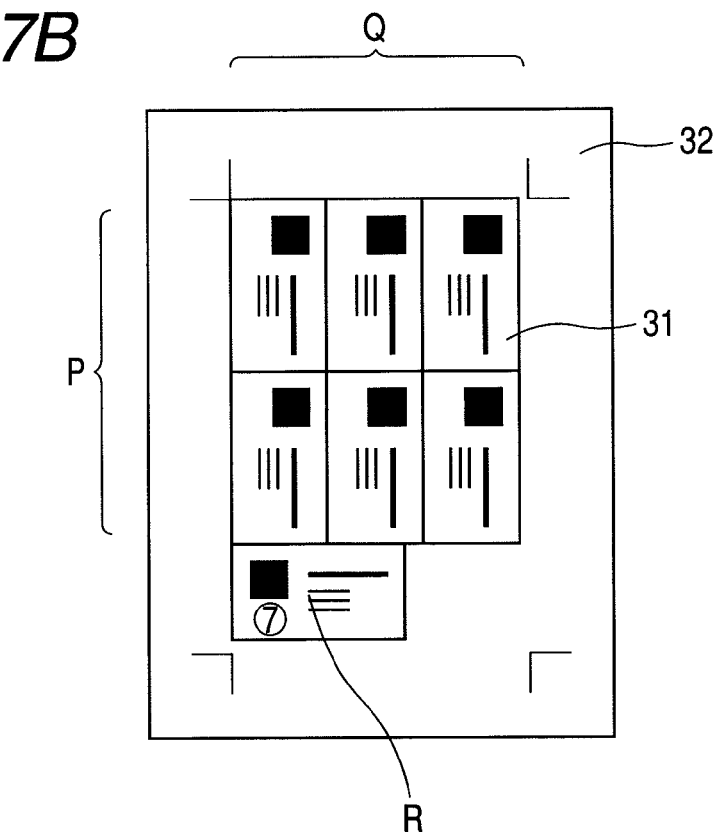

Furthermore, a check is performed to determine whether there is sufficient margin space in which to horizontally arrange a document 31. When there is adequate margin space, R document images 31 are so arranged. Through this process, P×Q+R document images 31 are arranged, as shown in FIG. 7B, wherein a seventh document 31 is arranged. When the number of copies is not designated (NO at S24), the maximum available number of images are arranged on a single page of a recording sheet 32, and the arranged image count calculation process is terminated.

When the user has designated the number of copies using the print preview dialogue (YES at S24), the printer driver 8P compares the number of copies designated by the user with the available arranged image count obtained using the arranged image count calculation (S25). When the number of copies designated by the user is smaller than the available arranged image count, the printer driver 8P reduces the arranged image count (S26), and terminates the arranged image count calculation process. Specifically, the image arranging unit 84 of the printer driver 8P reduces the number of images to match the number of copies designated by the user, so that the printing range in the layout area of the recording sheet 32 is decreased in the printing direction. For example, in FIG. 7B, seven images of the document 31 can be arranged on the recording sheet 32, but when the user designates six copies, the image arranging unit 84 of the printer driver 8P reduces the printing range in the printing direction so as to arrange document images as shown in FIG. 7A, and terminates the arranged image count calculation process.

Figure 8A:
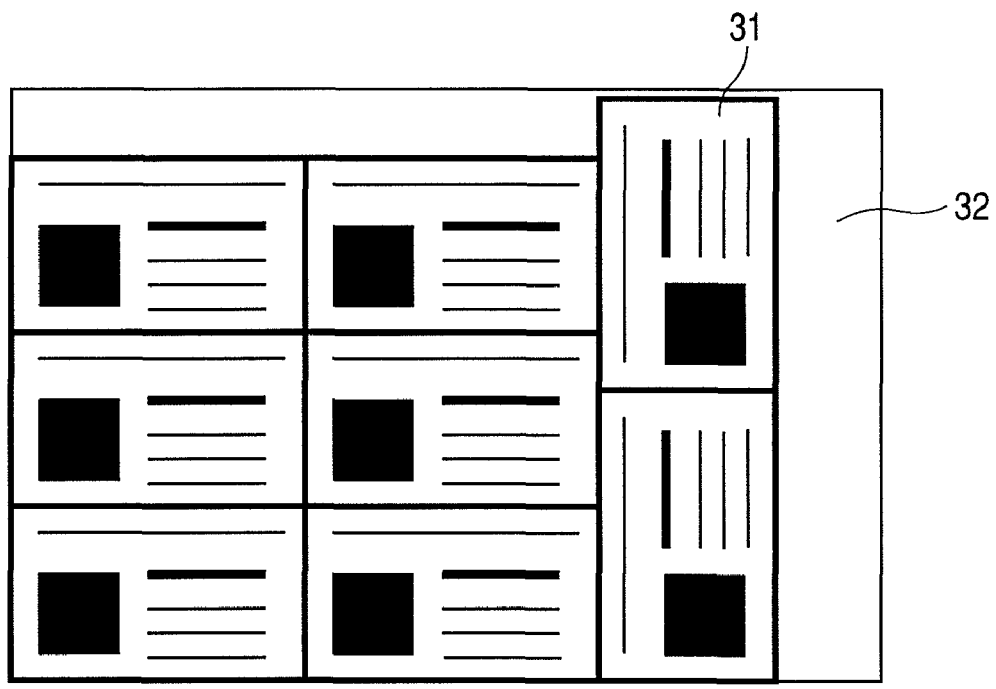
FIGS. 8A and 8B are diagrams showing the size reduction of document images.
Figure 8B:
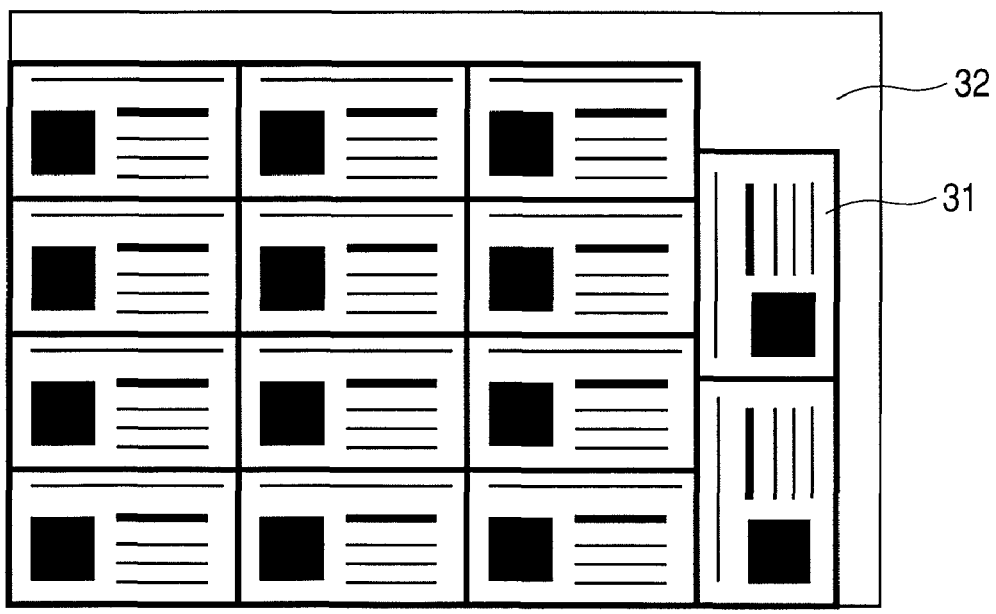

If the printer driver 8P finds that, as a result of the comparison, the number of copies designated by the user is greater than the available arranged image count (S25), the printer driver 8P requests that the user decide whether the arranged image count should match the number of copies designated (S27). When the arranged image count should match the number of copies designated (YES at S27), the printer driver 8P decrements the copy magnification rate (S28), i.e., reduces the size of the document 31 by a predetermined value (e.g., reduces the size of the document 31 to 80% of the original), and again performs the arranged image count calculation (S23). Thereafter, the process as described above is repeated, and the arranged image count calculation process is terminated. The process for arranging images by decrementing the copy magnification rate is shown in FIGS. 8A and 8B. In the case illustrated in FIG. 8A, eight document images 31 can be arranged in the printing area on the recording sheet 32. Thus, when the number of copies designated by a user is 14, and since only eight images of the document in its original size can be printed on a single page of a recording sheet 32, the image size reduction unit 85 of the printer driver 8P reduces the image size of the document 31 so that, as shown in FIG. 8B, 14 images of the document 31 can be printed on a single page of a recording sheet 32.

Figure 9:
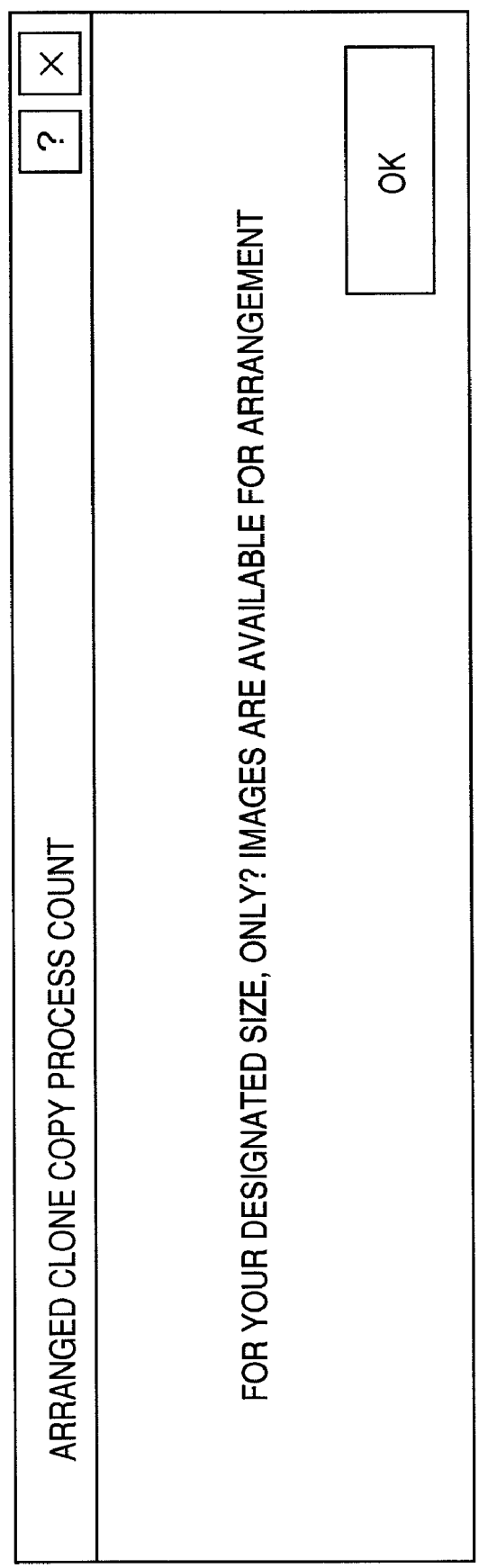
FIG. 9 is a diagram showing an example message box.

When the user indicates that the arranged image count does not need to match the designated number of copies (NO at S27), the available number of document images 31 to be arranged is displayed in a message box shown in FIG. 9 (S29), and the arranged image count calculation process is terminated.

Figure 10A:
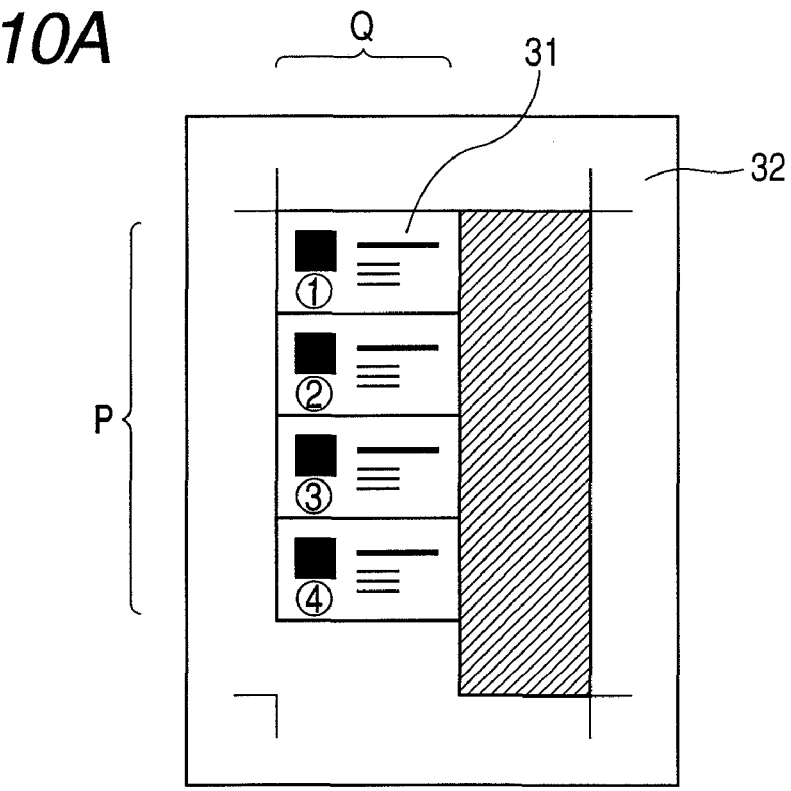
FIGS. 10A and 10B are diagrams showing the arrangement of images when the arrangement priority direction is horizontal.
Figure 10B:
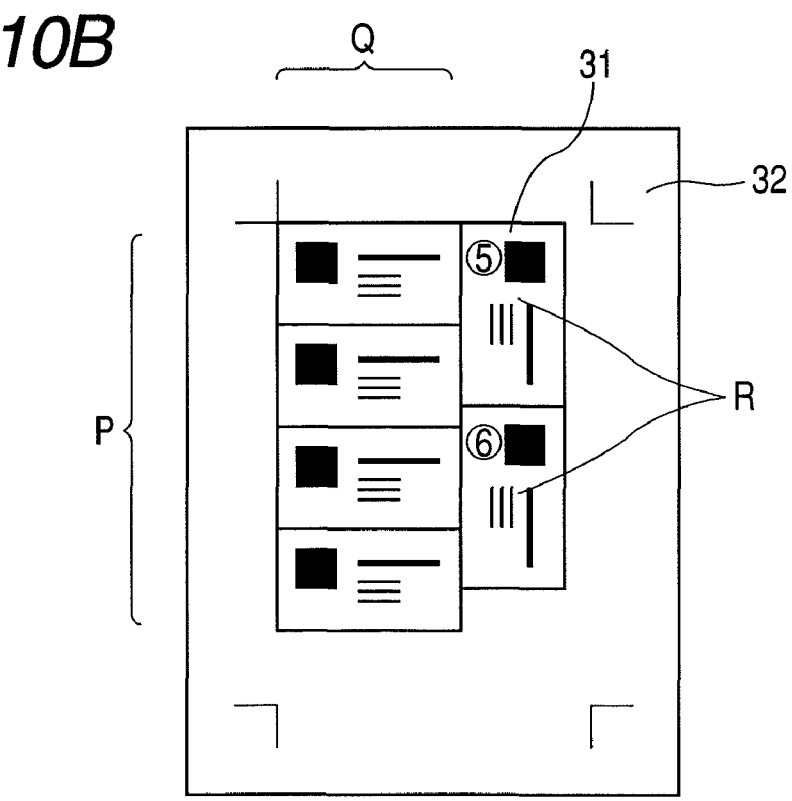

A case wherein the arranged priority direction is horizontal will now be explained while referring to FIGS. 10A and 10B. In this case, the document 31 is arranged so as to align its short side with the long side of the recording sheet 32. First, the number of document images 31 to be arranged along the long side of the recording sheet 32 is calculated. Then, the lengths of margins M1 and M2 on the recording sheet 32 are subtracted from the length of the long side L1 of the recording sheet 32, and the obtained length is divided by the length of the short side S2 of the document 31. Here, the quotient is the number of document images 31 that can be arranged along the long side of the recording sheet 32. That is, the number P of the document images 31 that can be arranged along the long side of the recording sheet 32 can be obtained using (L1−M1−M2)/S2.

Similarly, the lengths of margins M3 and M4 on the recording sheet 32 are subtracted from the length of the short side S1 of the recording sheet 32, and the obtained length is divided by the length of the long side L2 of the document 31. Here, the quotient is the number of document images 31 that can be arranged along the short side of the recording sheet 32. That is, the number Q of the document images 31 that can be arranged along the short side of the recording sheet 32 can be obtained using (S1−M3−M4)/L2. Through this process, the number of the document images 31 to be arranged is determined to be P×Q, and the document images 31 are arranged as shown in FIG. 10A.

Further, a check is performed to determine whether there is still enough space in which to arrange any additional documents 31 vertically. When there is enough space, R images of the document 31 are vertically arranged. As a result, P×Q+R images of the document 31 are arranged as shown in FIG. 10B. Thereafter, the same process is performed as when the arranged priority direction is vertical, and the arranged image count calculation process is terminated.

Figure 11:
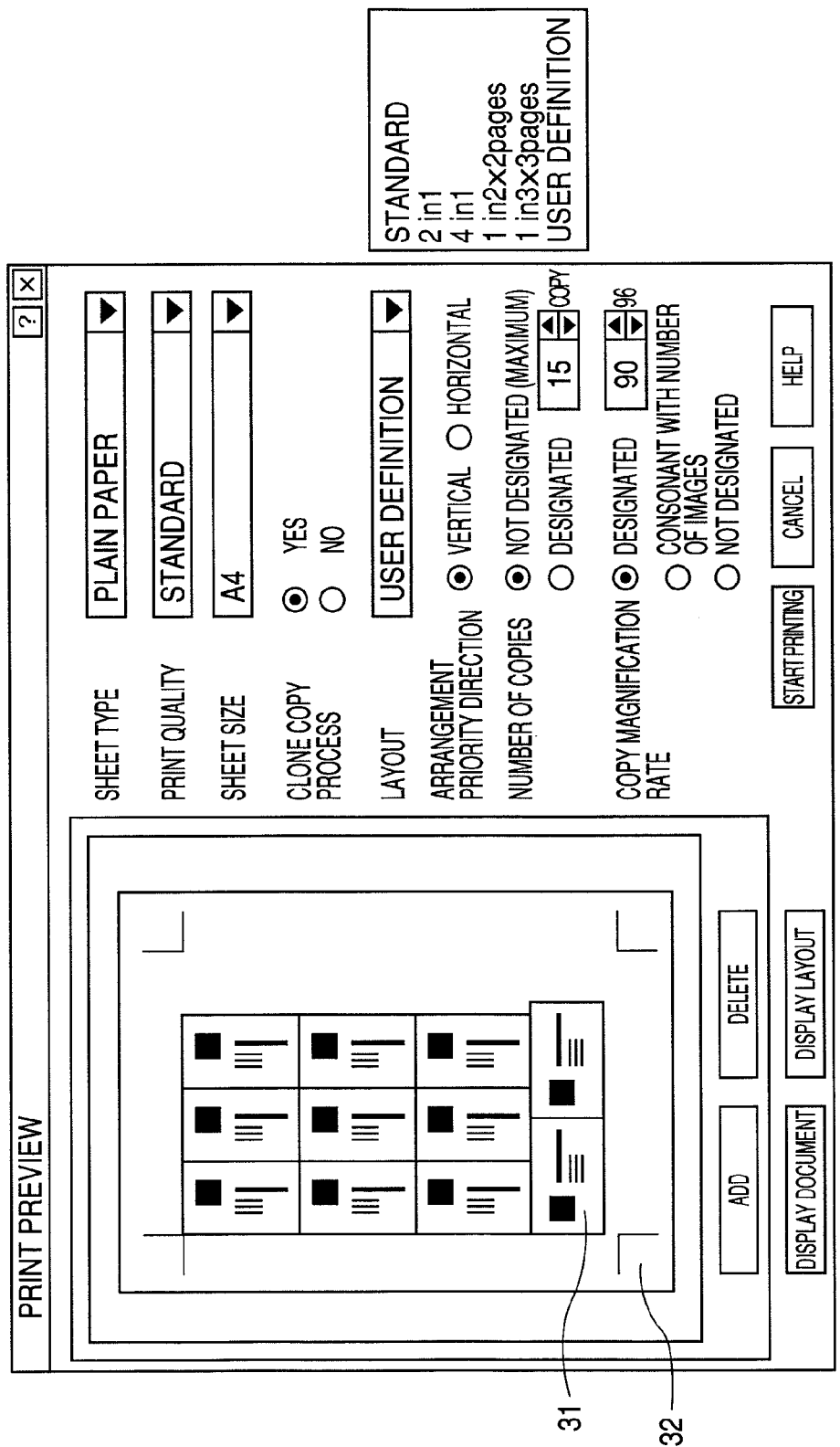
FIG. 11 is a diagram showing an example layout display.

Referring again to FIG. 3, when the arranged image count calculation process (S8), the standard clone copy process (S6) or the standard printing process (S7) has been completed, the printer driver 8P employs the process results and displays the layout using the print preview dialogue, as shown in FIG. 11 (S9).

Figure 12A:
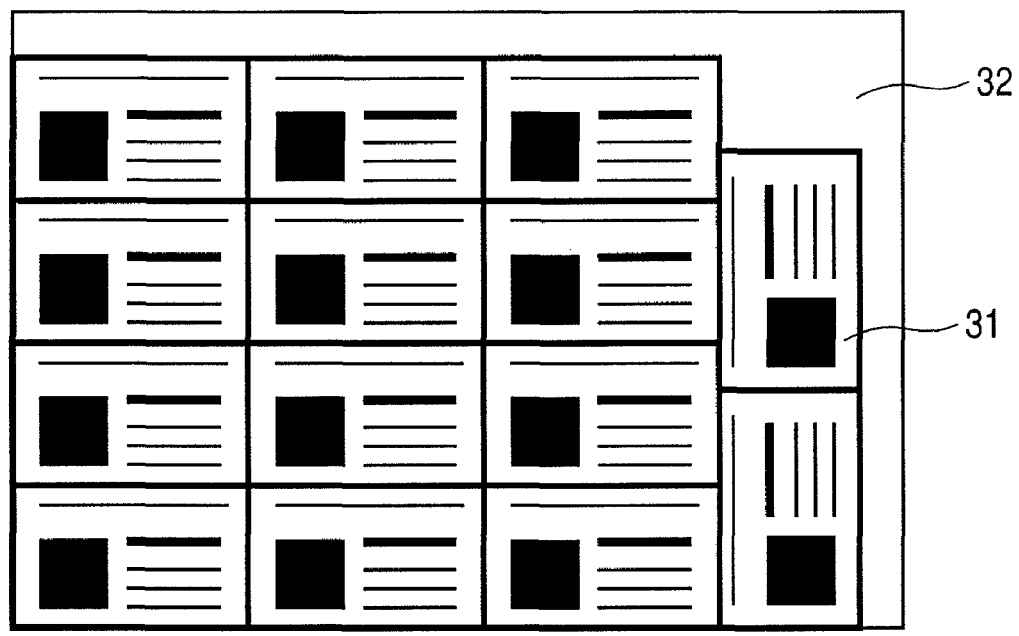
FIGS. 12A and 12B are diagrams showing a change in a layout.
Figure 12B:
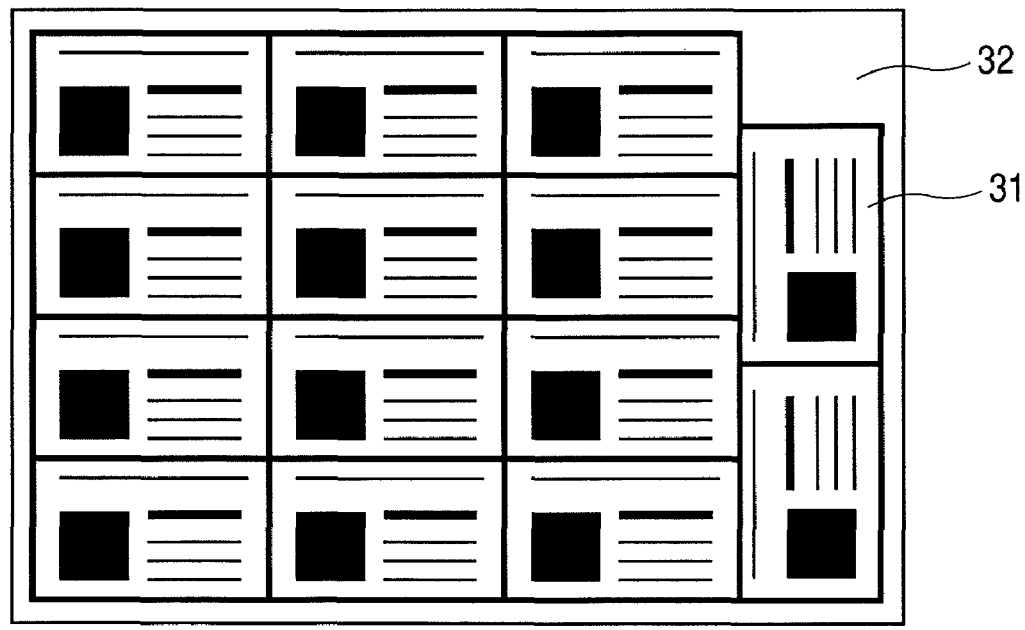
Figure 13:
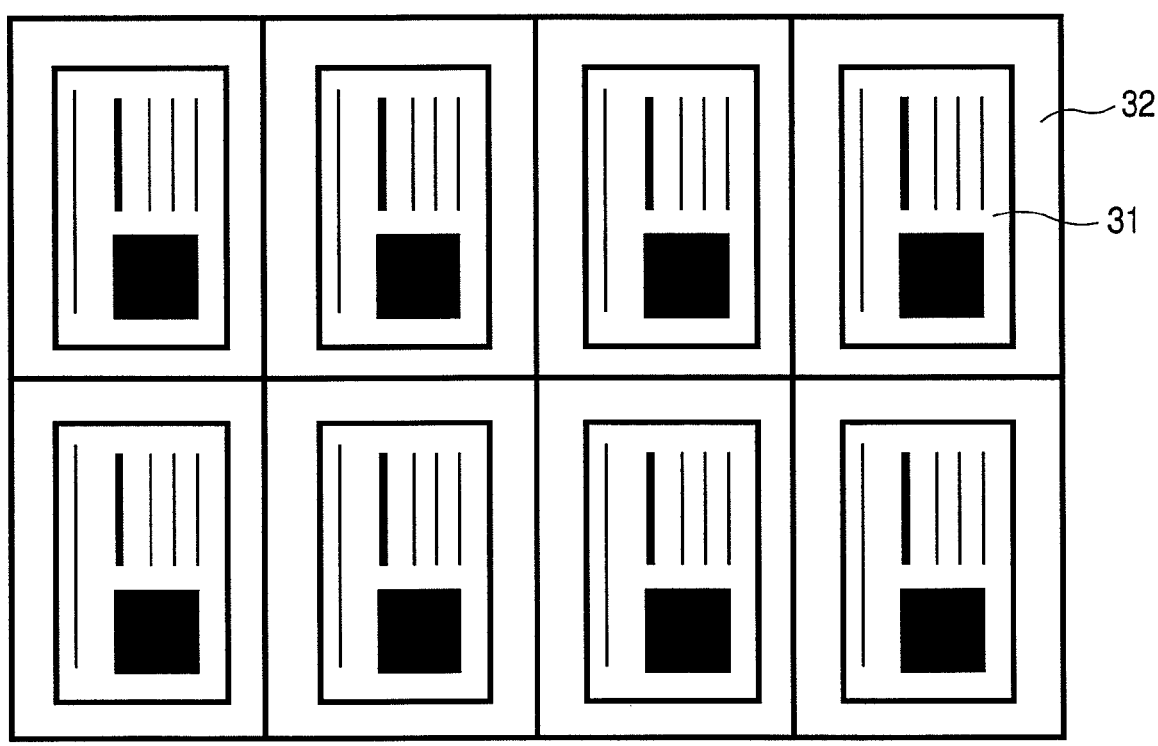
FIG. 13 is a diagram showing a conventional arrangement.

To change the setup (YES at S10), program control returns to S2, and the user again designates the sheet type, the printing quality and the sheet size. Further, when a layout shown in FIG. 12A is presented using the print preview dialogue, the user can use the mouse to drag the entire document 31 image, and can change the layout to the one shown in FIG. 12B. Alternatively, a button for centering the document 31 layout may be provided on the print preview dialogue.

When the user has determined that the setup is satisfactory, the user clicks on the start printing button on the print preview dialogue in FIG. 11. Then, the output unit 86 of the printer driver 8P transmits data to the printer 91 and printing is initiated (S11).

As described above, since the printer driver 8P arranges the individual images of the document 31 so that there are no margins between the images, many images of the document 31 can be printed on a single page of a recording sheet 32. Further, since the printer driver 8P has a size reduction function that can be used for the document 31, more reduced size images of the document 31 can be printed on a single page of a recording sheet 32.

What is claimed is:

1. An information processing apparatus comprising a processor, the apparatus comprising;
   a layout area acquisition unit which obtains, in order to output a plurality of images each having a same size quadrilateral shape for a single page of a recording sheet, a size of a layout area on the recording sheet on which the images are to be arranged, the layout area having a rectangular shape;
   an image size acquisition unit which obtains the size of the images;

an arrangement setting unit configured to designate an arrangement priority direction from a vertical direction and a horizontal direction;

an image arranging unit which creates layout data including the images arranged without margins being generated between the images in the layout area; and a data output unit which outputs an instruction to a printing unit to print layout data for the images, wherein, when the vertical direction is set as the arrangement priority direction, the image arranging unit arranges a first image of the plurality of images, such that the short side of the first image aligns with the short side of the layout area, and the long side of the first image aligns with the long side of the layout area;

at a first level in a first direction along the long side of the layout area, the image arranging unit sequentially arranges a second image of the plurality of images, such that the long side of the second image aligns with the long side of an adjacent image, at a second level in the first direction, the image arranging unit sequentially arranges a third image of the plurality of images, such that the short side of the third image at the second level aligns with the short side of an image at the first level in the first direction, and when a remaining portion of the layout area is less than the long side of an image of the plurality of images in the first direction, the image arranging unit arranges a fourth image of the plurality of images, such that the short side of the fourth image aligns the long side of the layout area at a third level in the first direction, wherein, when the horizontal direction is set as the arrangement priority direction, the image arranging unit arranges a first image of the plurality of images, such that the short side of the first image aligns with the long side of the layout area, and the long side of the first image aligns with the short side of the layout area, at a first level in a second direction along the short side of the layout area, the image arranging unit sequentially arranges a second image of the plurality of images, such that the long side of the second image aligns with the long side of an adjacent image, at a second level in the second direction, the image arranging unit sequentially arranges a third image of the plurality of images, such that the short side of the third image at the second level aligns with the short side of an image at the first level in the second direction, and when a remaining portion of the layout area is less than the long side of an image of the plurality of images in the second direction, the image arranging unit arranges a fourth image of the plurality of images, such that the short side of the image aligns with the short side of the layout area at a third level in the second direction, and wherein the image arranging unit is configured to calculate an available number of images to be arranged on the layout image area, the apparatus further comprising:

an arranged image number setting unit which sets an arbitrary number of images to be arranged on a single page of a recording sheet; and an image size reduction unit, which, when a number of arranged images set for the arranged image number setting unit is greater than an available number of images, reduces the sizes of the images, such that all of the number of arranged images are arranged on a single page of a recording sheet.

2. The information processing apparatus according to claim 1, wherein the image arranging unit arranges images so that sides of the individual images printed in the layout area on the recording sheet are aligned with each other.

3. The information processing apparatus according to claim 1, further comprising an arranged image count setting unit which sets an arbitrary number of images to be arranged on a single page of a recording sheet, wherein, when a number of arranged images that is set for the arranged image count setting unit is less than an available number of images to be arranged, the available number of images having been calculated by the image arranging unit, the image arranging unit reduces the available number of images for the layout area to the number of images set by the arranged image count setting unit so as to decrease a length of a printed area in a direction in which the recording sheet is to be printed.

4. The information processing apparatus according to claim 1, further comprising an image moving unit which moves arranged images to desired positions within the layout area.

5. The information processing apparatus according to claim 1, wherein the image arranging unit calculates an available number images to be arranged on the layout area based on $P \times Q + R$, where P is obtained based on a division of the long side length of the layout area by the long side length of the images, Q is obtained based on a division of the short side length of the layout area by the short side length of the images, and R is obtained based on a division of the short side length of the layout area by the long side length of the images.

6. A non-transitory computer readable storage medium comprising:

computer readable instructions stored thereon for enabling a computer to perform predetermined operations, the predetermined operations including the steps of:

designating an arrangement priority direction from a vertical direction and a horizontal direction;

obtaining, so as to output a plurality of images of a same size for a single page of a recording sheet, a size of a layout area on the recording sheet on which images are to be arranged, the layout area having a rectangular shape;

obtaining the size of the images;

creating data to arrange the images so that margins are not generated between the images in the layout area; and outputting an instruction to a printing unit to print layout data for the images wherein, when the vertical direction is set as the arrangement priority direction, arranging a first image of the plurality of images, such that the short side of the first image aligns with the short side of the layout area, and the long side of the first image aligns with the long side of the layout area;

at a first level in a first direction along the long side of the layout area, sequentially arranging a second image of the plurality of images, such that the long side of the second image aligns with the long side of an adjacent image, at a second level in the first direction, sequentially arranging a third image of the plurality of images, such that the short side of the third image at the second level aligns with the short side of an image at the first level in the first direction, and when a remaining portion of the layout area is less than the long side of an image of the plurality of images in the first direction, arranging a fourth image of the plurality of images, such that the short side of the fourth image aligns the long side of the layout area at a third level in the first direction, wherein, when the horizontal direction is set as the arrangement priority direction, arranging a first image of the plurality of images, such that the short side of the first image aligns with the long side of the layout area, and the long side of the first image aligns with the short side of the layout area, at a first level in a second direction along the short side of the layout area, sequentially arranging a second image of the plurality of images, such that the long side of the second image aligns with the long side of an adjacent image, at a second level in the second direction, sequentially arranging a third image of the plurality of images, such that the short side of the third image at the second level aligns with the short side of an image at the first level in the second direction, and wherein, after calculating an available number of images to be arranged on the layout image area,:

setting an arbitrary number of images to be arranged on a single page of a recording sheet; and when a number of arranged images set for the arranged image number setting unit is greater than an available number of images, reducing the sizes of the images, such that all of the number of arranged images are arranged on a single page of a recording sheet.

7. An information processing apparatus comprising a processor, the apparatus comprising;

a layout area acquisition unit which obtains in order to output a plurality of images each having a same size quadrilateral shape for a single page of a recording sheet, a size of a layout area on the recording sheet on which the images are to be arranged, the layout area having a rectangular shape;

an image size acquisition unit which obtains the size of the images;

an image arranging unit which creates layout data including the images arranged without margins between the images in the layout area;

a data output unit which outputs an instruction to a printing unit to print layout data for the images, wherein the image arranging unit calculates an available number images to be arranged on the layout area based on P×Q+R, where P is obtained based on a division of the long side length of the layout area by the long side length of the images, Q is obtained based on a division of the short side length of the layout area by the short side length of the images, and R is obtained based on a division of the short side length of the layout area by the long side length of the images, and wherein the apparatus further comprising:

an arranged image number setting unit which sets an arbitrary number of images to be arranged on a single page of a recording sheet; and an image size reduction unit, which, when a number of arranged images set for the arranged image number setting unit is greater than an available number of images, reduces the sizes of the images, such that all of the number of arranged images are arranged on a single page of a recording sheet.

* * * * *